(12) United States Patent
Jones

(10) Patent No.: US 9,086,035 B2
(45) Date of Patent: Jul. 21, 2015

(54) INTEGRATED THRUST REVERSER ACTUATOR AND VARIABLE AREA FAN NOZZLE ACTUATOR

(75) Inventor: Teddy L. Jones, Cherry Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 513 days.

(21) Appl. No.: 13/354,954

(22) Filed: Jan. 20, 2012

(65) Prior Publication Data

US 2013/0186219 A1    Jul. 25, 2013

(51) Int. Cl.
| | |
|---|---|
| B64C 9/02 | (2006.01) |
| B64D 33/04 | (2006.01) |
| B64C 13/28 | (2006.01) |
| B64C 13/34 | (2006.01) |
| F02K 1/76 | (2006.01) |

(52) U.S. Cl.
CPC ............ *F02K 1/763* (2013.01); *Y10T 74/18704* (2015.01)

(58) Field of Classification Search
CPC .......... B64C 9/02; B64C 13/28; B64C 13/34; B64C 13/30; Y02T 50/671; B64D 33/04
USPC .............. 244/110 B, 99.3, 99.2; 239/265.29, 239/265.31, 265.33; 60/226.2, 230, 232; 74/424.81–424.4, 424.89
See application file for complete search history.

(56) References Cited

U.S. PATENT DOCUMENTS

| | | | | |
|---|---|---|---|---|
| 3,621,763 | A * | 11/1971 | Geyer | 92/17 |
| 4,637,272 | A * | 1/1987 | Teske et al. | 74/89.26 |
| 5,448,884 | A * | 9/1995 | Repp | 60/223 |
| 6,401,557 | B1 * | 6/2002 | Davies | 74/89.39 |
| 6,494,033 | B1 * | 12/2002 | Davies | 60/226.2 |
| 6,622,963 | B1 * | 9/2003 | Ahrendt et al. | 244/54 |
| 6,786,039 | B2 * | 9/2004 | Chakkera et al. | 60/226.2 |
| 6,935,097 | B2 * | 8/2005 | Eschborn | 60/226.2 |
| 6,974,107 | B2 * | 12/2005 | Christensen et al. | 244/101 |
| 7,093,424 | B2 * | 8/2006 | Hanlon et al. | 60/226.2 |
| 7,264,203 | B2 * | 9/2007 | Lair | 244/110 B |
| 7,946,105 | B2 * | 5/2011 | Bristol et al. | 60/226.2 |
| 8,256,657 | B2 * | 9/2012 | Stol et al. | 228/2.1 |
| 8,413,875 | B2 * | 4/2013 | Stol et al. | 228/2.1 |
| 8,453,429 | B2 * | 6/2013 | Gabel | 60/226.2 |
| 8,545,178 | B2 * | 10/2013 | Perkinson et al. | 416/27 |
| 2002/0157376 | A1 * | 10/2002 | Ahrendt | 60/204 |
| 2003/0029258 | A1 * | 2/2003 | Davies et al. | 74/89.26 |
| 2003/0066284 | A1 * | 4/2003 | Chakkera et al. | 60/226.2 |
| 2004/0206066 | A1 * | 10/2004 | Eschborn | 60/223 |
| 2005/0001095 | A1 * | 1/2005 | Christensen | 244/110 B |
| 2010/0275710 | A1 * | 11/2010 | Wingett et al. | 74/424.82 |

* cited by examiner

*Primary Examiner* — Tien Dinh
*Assistant Examiner* — Assres H Woldemaryam
(74) *Attorney, Agent, or Firm* — Cantor Colburn LLP

(57) ABSTRACT

An integrated thrust reverser and variable area fan nozzle actuator includes a ballscrew shaft having a first ballnut and a second ballnut. The second ballnut is fastened to a first translatable object. A bearing is affixed to the ballscrew shaft between the first ballnut and the second ballnut. A second translatable object is coupled to the bearing. A drive mechanism is operably coupled to the first ballnut for rotation and a locking mechanism selectively couples the ballscrew shaft to the first ballnut.

13 Claims, 3 Drawing Sheets

INTEGRATED THRUST REVERSER ACTUATOR AND VARIABLE AREA FAN NOZZLE ACTUATOR

BACKGROUND OF THE INVENTION

This invention relates generally to turbine engines and, more particularly, to a turbine engine having a variable area fan nozzle and a thrust reverser.

It is known to provide an aircraft turbine engine with a series of movable cowls, the positions of which can be adjusted using appropriate actuators. In operation, a bypass airflow flows through a passage between a housing surrounding the turbine (or "core") and exits from the engine through a fan nozzle. A majority of propulsion thrust is provided by this bypass airflow passing through the fan nozzle. Some turbine engines include a variable area fan nozzle (VAFN) which allows the nozzle size to be adjusted by movement of the cowls. The nozzle dimension is the size of the exit throat defined between the exit end of the fan cowl and the core engine housing (e.g., the turbine). It has been found to be advantageous for the nozzle dimension to be relatively large during take-off and climb phases of engine operation, and to be reduced during cruise conditions. During descent, the nozzle dimension is often increased in case it is necessary to abort landing and enter another climb phase.

When an aircraft lands, the landing gear brakes and imposed aerodynamic drag loads (e.g. flaps, spoilers, etc.) of the aircraft may not be sufficient to slow the aircraft down in the required distance. Thus, most aircraft engines also include thrust reversers to enhance the stopping power of the aircraft. When deployed, thrust reversers redirect the rearward thrust of the engine forward, thereby decelerating the aircraft. The thrust reverser system of an aircraft engine includes a series of cowls positioned on either side of the engine and movable between a stowed and a deployed, operative position. Each cowl is guided for movement along a pair of guide tracks and is driven by a thrust reverser actuator system (TRAS) including a linearly extendable actuator. During deployment, actuators drive the cowl from its stowed position towards a deployed position. Thrust reversers are generally only used for thrust reversal during landing and provide no other additional functionality.

Prior aircraft applications provided separate actuators to drive the VAFN cowls and the thrust reverser cowls and both actuators were grounded to the aircraft structure. The arrangement of a separate actuator for each set of cowls results in the VAFN actuator having a very large stroke which has significant cost, power, and weight implications.

BRIEF DESCRIPTION OF THE INVENTION

According to one embodiment of the invention, an actuator system is provided including a ballscrew shaft, and a first ballnut and a second ball nut that are engaged with the ball screw shaft. The second ballnut is fastened to a first translatable object. A bearing is fixedly attached to the ballscrew shaft between the first ballnut and the second ballnut. The bearing is fastened to a second translatable object. A drive mechanism is operably coupled to the first ballnut for rotation, and a locking mechanism couples the first ballnut to the ballscrew shaft such that when the locking mechanism is engaged the first ballnut and the ballscrew shaft rotate as a uniform body.

According to another embodiment of the invention, a method is provided for actuating a thrust reverser of an aircraft, the method including disengaging a locking mechanism. The locking mechanism prevents rotation of a first ballnut relative to a ballscrew shaft. The first ball nut is then rotated such that the ballscrew shaft moves relative to the first ballnut, thereby causing translation of a movable cowl associated with the ballscrew shaft.

According to yet another embodiment of the invention, a method is provided for actuating a variable area fan nozzle of an aircraft, the method including engaging a locking mechanism that couples a first ballnut to a ballscrew shaft. The first ballnut and coupled ballscrew shaft are then rotated as a single body such that a second ballnut engaged with the ballscrew shaft moves relative to the first ballnut, thereby causing translation of a movable cowl fastened to the second ballnut.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

The following detailed description explains embodiments of the invention, together with advantages and features, by way of example with reference to the drawings.

Figure 1:
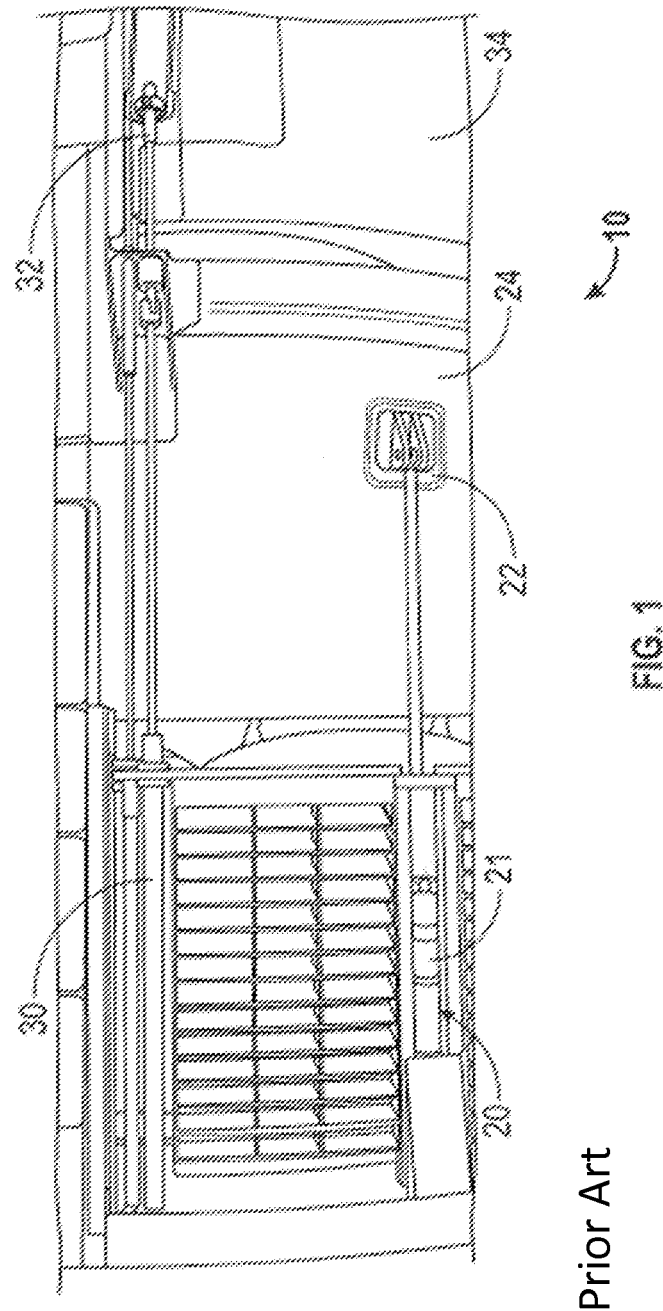
FIG. 1 is a side-view of an engine having a conventional thrust reverser actuation system (TRAS) and a conventional variable area fan nozzle (VAFN) actuator.

Referring first to FIG. 1, there is illustrated, diagrammatically, a side view of a portion of a conventional engine 10 having a plurality of movable cowls. As illustrated, a thrust reverser actuation system (TRAS) 20 is disposed towards the bottom of a side of the engine 10. The TRAS 20 includes a hydraulic linear actuator 21 connected at an end 22 to a translatable TRAS cowl 24. The TRAS cowl 24 slides along a guide track (not shown) horizontally along the longitudinal axis of the engine. In FIG. 1, the TRAS 20 is illustrated in a deployed or extended position for simplification. The engine 10 additionally includes an actuator 30 for a variable area fan nozzle (VAFN) system. The VAFN actuator 30 is disposed near an opposite edge of TRAS cowl 24 from the TRAS 20. The VAFN actuator 30 is connected at an end 32 to a translatable VAFN cowl 34. The VAFN cowl 34 is positioned on the trailing edge of the TRAS cowl 24 such that if the TRAS cowl 24 translates in a first direction, the VAFN cowl 34 translates the same distance in the same direction. The VAFN cowl 34 may also be moved independently of the TRAS cowl 24. These two separate and independently controlled actuation systems for moving the TRAS cowl 24 and the VAFN cowl 34 add significant weight and cost to the engine 10.

Figure 2:
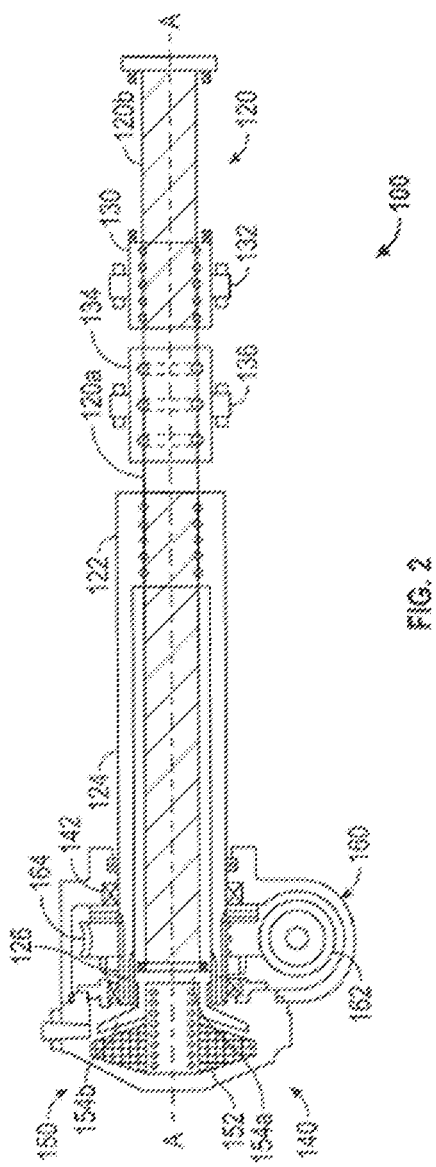
FIG. 2 is a partial cut-away side view of an actuator arrangement in accordance with an embodiment of the invention.
Figure 3:
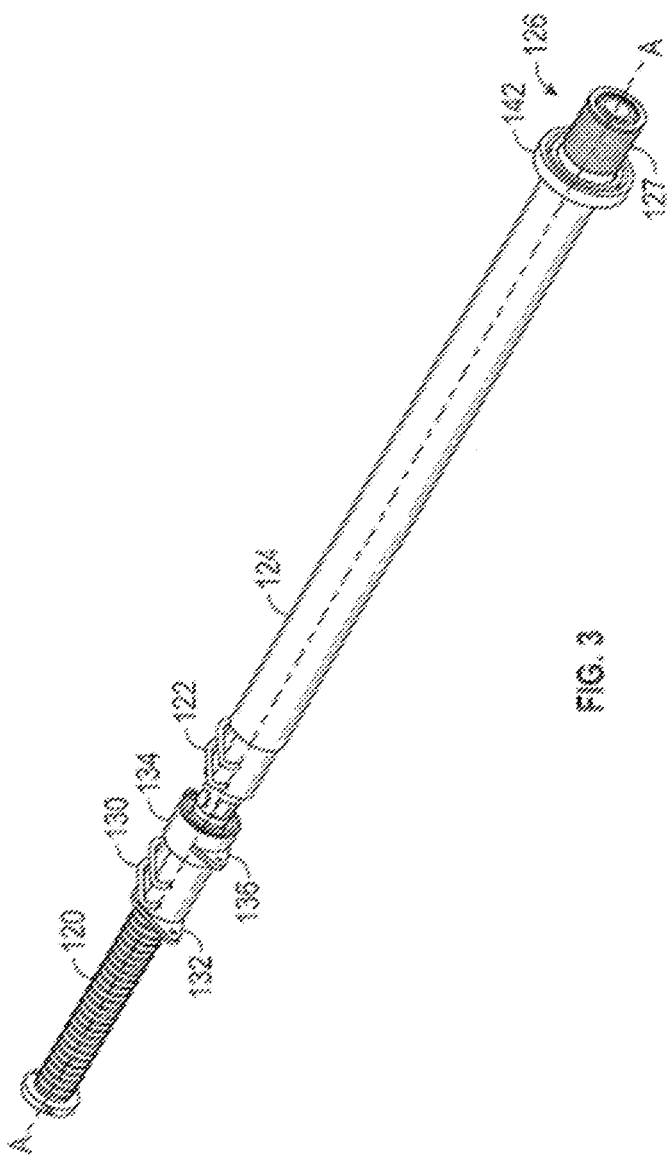
FIG. 3 is a perspective view of the actuator of FIG. 2 with the actuator housing removed.

Referring now to FIGS. 2 and 3, an integrated TRAS and VAFN actuator assembly 100 for mounting to an engine is shown in accordance with an embodiment of the present invention. The actuator assembly 100 includes a ballscrew shaft 120 upon which a first ballnut 122 and a second ballnut 130 are mounted. The ballscrew shaft 120, first ballnut 122, and second ballnut 130 rotate about the central axis A of the ballscrew shaft 120. The ballscrew shaft 120 has a length such that an associated VAFN cowl (not shown) may reach a fully deployed position. In one embodiment of the invention, the ballscrew shaft 120 is formed by a first ballscrew shaft 120a operatively coupled to a second ballscrew shaft 120b. In such an embodiment, the first ballnut 122 is engaged with the first ballscrew shaft 120a and the second ballnut 130 is engaged with the second ballscrew shaft 120b.

Attached to the first ballnut 122 is an integrated sleeve 124. The sleeve 124 extends from the first ballnut 122 to the actuator housing 140, such that the portion of the ballscrew shaft 120 between the first ballnut 122 and the actuator housing 140 is disposed within the sleeve 124. The inner diameter of the sleeve 124 is greater than the outer diameter of the ballscrew shaft 120 such that the sleeve 124 and the ballscrew shaft 120 are not in contact. The second ballnut 130 has an external flange or coupling means 132 for fastening the second ballnut 130 to a first translatable object (not shown), such as a VAFN cowl for example. Disposed on the ballscrew shaft 120 between the first ballnut 122 and the second ballnut 130 is a bearing 134. The inner race of bearing 134 is fixably attached to the ballscrew shaft 120 such that the bearing 134 does not translate relative to the ballscrew shaft 120. The outer race of bearing 134 is rotatable about the central axis A of the ballscrew shaft 120. The outer race of bearing 134 has an external flange or coupling means 136 for connecting the bearing 134 to a second translatable object (not shown), such as a TRAS cowl for example.

The free end 126 of the sleeve 124 is supported in the actuator housing 140 by a ball bearing 142. This ball bearing 142 prevents translation of the first ballnut 122 relative to the actuator housing 140. The free end 126 of the sleeve 124 is rotatably coupled to a drive mechanism 160 including a worm gear 162 and a helical gear 164. As illustrated in FIG. 3, the circumference of the outer surface of free end 126 of the sleeve 124 includes a plurality of splines 127. These splines 127 mate with a plurality of complementary splines located about the circumference of the inner surface of the helical gear 164. In an alternate embodiment, a keyway and key or other mating configuration may be used to transmit the torque of the helical gear 164 to the sleeve 124 and first ballnut 122. A power drive unit (not shown) centrally located on the engine drives the plurality of actuators disposed about the engine. A flexible drive shaft (not shown) connects the power drive unit to the actuator drive mechanism 160. Rotation of the flexible drive shaft drives the worm gear 162, which in turn causes the first ballnut 122 to rotate. Since the free end 126 of the sleeve 124 does not translate relative to the actuator housing 140, the rotation of the first ballnut 122 in a first direction causes the ballscrew shaft 120, the bearing 134, and the second ballnut 132 to extend in a direction away from the first ballnut 122. Rotation of the first ballnut in a second, opposite direction causes the ballscrew shaft 120, the bearing 134, and the second ballnut 132 to retract in a direction toward the first ballnut 122.

The integrated actuator system 100 additionally includes a locking mechanism 150 for coupling the rotation of the first ballnut 122 to the ballscrew shaft 120. The locking mechanism 150 is positioned within the actuator housing 140 and is aligned about central axis A. In the exemplary embodiment, the locking mechanism 150 includes a translating, spring loaded locking sleeve 154. The locking sleeve 154 has a first cylindrical end 154a, a portion of which contacts the inner surface of free end 126 of sleeve 124. Extending from the portion of the first cylindrical end 154b that does not contact sleeve 124 is a conical flange 154b. A solenoid 152 is disposed adjacent the locking sleeve 154 between the conical flange 154b and the actuator housing 140. The first cylindrical end 154a has a plurality of splines positioned about its outer circumference. Around the circumference of the inner surface of free end 126 is a plurality of complementary splines. The plurality of splines on the first cylindrical end 154a are engaged with the plurality of splines on the free end 126 such that the locking sleeve 154 and the first ballnut 122 are mated together. A stop device is positioned at the end of the ballscrew shaft 120 closest to the actuator housing 140. A second stop device is connected to the locking sleeve 154. The stop devices may be conventional overtravel stops, dog stops or any other similar device. In one embodiment, the locking sleeve 150 and the ballscrew shaft 120 have multiple stop devices.

When the locking mechanism 150 is in a locked position, both the ballscrew shaft 120 and the first ballnut 122 are coupled to the locking sleeve 154. The stop device on the locking sleeve 154 mates with the stop device of the ballscrew shaft 120, thereby coupling the ballscrew shaft 120 to the locking sleeve 154. The first ballnut 122 is already mated to the locking sleeve 154 via the plurality of splines about the outer circumference of the first cylindrical end 154a and the inner circumference of free end 126. When the lock is engaged, rotation of the first ballnut 122 by the drive mechanism 160 causes the first ballnut 122, the lock sleeve 154, and the ballscrew shaft 120 to rotate as a single body.

To disengage the locking mechanism, power is applied to solenoid 152. The conical flange 154b of the locking sleeve 154 is attracted to the energized solenoid 152. When power is applied to the solenoid 152, the locking sleeve 154 translates axially toward the solenoid 152, causing the stop devices on the locking sleeve 154 to disengage from the stop devices on the ballscrew shaft 120. This uncoupling of the ballscrew shaft 120 from the locking sleeve 154 allows the first ballnut 122 to rotate relative to the ballscrew shaft 120 such that the ballscrew shaft 120 translates relative to the first ballnut 122. As soon as power is removed from the solenoid 152, the spring force of the spring loaded locking sleeve 154 causes the locking sleeve 154 to translate towards the first ballnut 122, such that the stop devices of the locking sleeve 154 and the ballscrew shaft 120 re-engage. The above described locking mechanism 150 is exemplary, and any alternate locking mechanism capable of coupling the ballscrew shaft 120 to the first ballnut 122 is sufficient for use with actuator 100.

In most aircraft applications, the thrust reverser cowls are generally only deployed when the aircraft is landing because the cowls act against the forward travel of the aircraft, causing the aircraft to decelerate. Depending on the phase of the flight, the VAFNs may be adjusted to improve engine efficiency. Therefore, it is desirable to be able to move the VAFN cowl independently of the TRAS cowl. In aircraft applications, when the TRAS cowl is fully retracted, the locking mechanism 150 of the actuator 100 may default to an engaged position so that the thrust reversers are not deployed accidentally. In the engaged position, the stop devices connected to the locking mechanism 150 are engaged with the stop device on the ballscrew shaft 120, thereby coupling the first ballnut 122 and the ballscrew shaft 120. To deploy the VAFN cowl, the ballscrew shaft 120 must be rotated. Applying power to the drive mechanism 160 causes the worm gear 162 and helical gear 164 to spin. Because the sleeve 124 is mated to the helical gear 164, the first ballnut 122 and coupled ballscrew shaft 120 will rotate as a single body such that the bearing 134 and the second translatable object (not shown) remain at a fixed distance from the first ballnut 122. Even though the ballscrew shaft 120 is rotating, the ballscrew shaft 120 does not translate with respect to either the first ballnut 122 or the second ballnut 130. It will be appreciated that in such an arrangement, rotation of the ballscrew shaft 120 causes the second ballnut 130 to extend or retract relative to the first ballnut 122, and the first translatable object to translate relative to the second translatable object. Therefore, rotation of the drive mechanism 160 while the lock is engaged deploys the second translatable object, such as the VAFN cowl for example, independently from the first translatable object, such as the TRAS cowl for example.

To deploy the TRAS cowls, the locking mechanism 150 must be disengaged. By providing power to the solenoid 152 of the locking mechanism 150, the locking sleeve 154 is translated axially away from the ballscrew shaft 120 causing the mated stop devices of the locking sleeve and ballscrew shaft 120 to disengage. This separation de-couples the ballscrew shaft 120 from the locking sleeve 154, thereby allowing the locking sleeve 154 coupled with the first rotating ballnut 122 to rotate independently of the ballscrew shaft 120. Applying power from the power drive unit causes the worm gear 162 in the drive mechanism 160 to spin. The worm gear 162, in turn, causes the helical gear 164 mated with the first ballnut 122 via a plurality of splines to rotate. Because the ballscrew shaft 120 is no longer coupled to the first ballnut 122, rotation of the first ballnut 122 causes the ballscrew shaft 120 to translate relative to the first ballnut 122. It will be appreciated that in such an arrangement, translation of the ballscrew shaft 120 causes both the second ballnut 130 fastened to the first translatable object and the bearing 134 connected to the second translatable object to translate relative to the first ballnut 122. However, when the locking mechanism 150 is disengaged, rotation of the first ballnut 122 does not cause the second ballnut 130 and the bearing 134 to translate relative to each other.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An actuator system comprising:
   a ballscrew shaft;
   a first ballnut engaged with the ballscrew shaft;
   a second ballnut engaged with the ballscrew shaft and attached to a first translatable object, the second ballnut being separated from the first ballnut by a distance;
   a bearing fixed to the ballscrew shaft between the first ballnut and the second ballnut and coupled to a second translatable object;
   a drive mechanism operably coupled to the first ballnut that rotates the first ballnut; and
   a locking mechanism configured to selectively couple the ballscrew shaft to the first ball nut, wherein operation of the locking mechanism adjusts a position of the first translatable object and the second translatable object independently.

2. The actuator system of claim 1, wherein the first translatable object is a variable area fan nozzle cowl.

3. The actuator system of claim 1, wherein the second translatable object is a thrust reverser cowl.

4. The actuator system of claim 1, wherein when the locking mechanism is coupling the ballscrew shaft to the first ballnut, the first ballnut rotates in unison with the ballscrew shaft causing the second ballnut to translate relative to the first ballnut.

5. The actuator system of claim 1, wherein when the locking mechanism is not coupling the ballscrew shaft to the first ballnut, the first ballnut rotates relative to the ballscrew shaft such that the ballscrew shaft translates relative to the first ballnut.

6. The actuator system of claim 1, wherein the ballscrew shaft comprises a first ballscrew shaft coupled to a second ballscrew shaft.

7. The actuator system of claim 1, wherein the first ballnut does not translate relative to a housing of the actuator system.

8. The actuator system of claim 7, wherein the outer circumference of the free end of the first ballnut has a plurality of splines for mating to the drive mechanism.

9. A method for actuating a thrust reverser of an aircraft engine comprising:
   providing an actuator system configured to translate a first movable cowl and a second movable cowl, the actuator system including a ballscrew shaft, a first ballnut rotatably engaged with the ballscrew shaft, a second ballnut rotatably engaged with the ballscrew shaft, a bearing fixed to the ballscrew shaft between the first ballnut and the second ballnut and a locking mechanism configured to adjusts a position of the first movable cowl and the second movable cowl independently;
   disengaging a locking mechanism such that the ballscrew shaft is configured to rotate relative to the first ballnut; and
   rotating the first ballnut such that the ballscrew shaft moves relative to the first ballnut thereby causing translation of the first movable cowl associated with the ballscrew shaft, wherein a position of the second ballnut relative to the ballscrew shaft remains constant.

10. The method for actuating a thrust reverser according to claim 9, wherein the movable cowl is a thrust reverser cowl.

11. The method for actuating a thrust reverser according to claim 9, wherein the locking mechanism includes a solenoid and power is applied to the solenoid to disengage the locking mechanism.

12. A method for actuating a variable area fan nozzle of an aircraft engine comprising:
   providing an actuator system configured to translate a first movable cowl and a second movable cowl, the actuator system including a ballscrew shaft, a first ballnut rotatably engaged with the ballscrew shaft, a second ballnut rotatably engaged with the ballscrew shaft, a bearing fixed to the ballscrew shaft between the first ballnut and the second ballnut and a locking mechanism configured to adjusts a position of the first movable cowl and the second movable cowl independently;
   engaging a locking mechanism that fixedly couples a first ballnut to a ballscrew shaft; and
   rotating the first ballnut and therefore the ballscrew shaft such the ballscrew shaft and the second ballnut coupled to the ballscrew shaft move relative to the first ballnut, thereby causing translation of the second movable cowl relative to the first movable cowl.

13. The method for actuating a variable area fan nozzle according to claim 12, wherein the movable cowl is a variable area fan nozzle cowl.

* * * * *